(12) United States Patent
Shindou et al.

(10) Patent No.: US 7,899,332 B2
(45) Date of Patent: Mar. 1, 2011

(54) MOBILE TERMINAL APPARATUS

(75) Inventors: Noriaki Shindou, Kawasaki (JP);
Masahiro Taguchi, Kawasaki (JP);
Masaaki Saitou, Kawasaki (JP);
Nobuaki Hatanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1044 days.

(21) Appl. No.: 11/319,102

(22) Filed: Dec. 28, 2005

(65) Prior Publication Data

US 2007/0065158 A1    Mar. 22, 2007

(30) Foreign Application Priority Data

Sep. 22, 2005 (JP) ................. 2005-276639

(51) Int. Cl.
*H04B 10/00* (2006.01)
*H04B 10/06* (2006.01)

(52) U.S. Cl. ......... 398/114; 398/116; 398/135; 398/138; 398/169; 398/212; 398/214

(58) Field of Classification Search .................. 398/107, 398/113, 114, 116, 117, 135, 138, 168, 169, 398/201, 212, 214
See application file for complete search history.

(56) References Cited

U.S. PATENT DOCUMENTS

| | | | | |
|---|---|---|---|---|
| 5,019,814 A | * | 5/1991 | Biggs et al. | 340/870.29 |
| 5,949,565 A | | 9/1999 | Ishida | |
| 6,353,693 B1 | * | 3/2002 | Kano et al. | 385/26 |
| 7,430,223 B2 | * | 9/2008 | Smith et al. | 370/535 |
| 2003/0087610 A1 | | 5/2003 | Ono | 455/90 |
| 2004/0208611 A1 | * | 10/2004 | Oettinger et al. | 398/149 |

FOREIGN PATENT DOCUMENTS

| | | |
|---|---|---|
| JP | 8-314832 | 11/1996 |
| JP | 10-97346 | 4/1998 |
| JP | 2002-157046 | 5/2002 |
| JP | 2003-143272 | 5/2003 |
| JP | 2004-247887 | 9/2004 |
| JP | 2005-32110 | 2/2005 |
| JP | 2005-64843 | 3/2005 |
| JP | 2005-202676 | 7/2005 |
| JP | 2005-252334 | 9/2005 |

OTHER PUBLICATIONS

Japanese Office Action dated Mar. 9, 2010 (with English translation).
Japanese Decision dated Aug. 3, 2010 (with its English translation).

* cited by examiner

*Primary Examiner* — Dalzid Singh
(74) *Attorney, Agent, or Firm* — Kratz, Quintos & Hanson, LLP

(57) ABSTRACT

An optical communication unit performs a bidirectional information transmission between a circuit device in a fixed housing and a circuit device in a moving housing with an optical signal. The optical communication unit includes a light transmitting unit that transmits the optical signal, a light receiving unit that receives the optical signal from the light transmitting unit, and a light propagation path for propagating the optical signal from the light transmitting unit to the light receiving unit. The light propagation path is disposed inside a hinge part that links the fixed housing and the moving housing in an openable and closable manner.

6 Claims, 13 Drawing Sheets

MOBILE TERMINAL APPARATUS

BACKGROUND OF THE INVENTION

1. Field of the Invention

The present invention relates to a mobile terminal apparatus, and more particularly, to a mobile terminal apparatus with an easy design layout, a bidirectional optical communication between a fixed part and a moving part of a housing, a compact size, an increased reliability, and a signal-line noise rejection.

2. Description of the Related Art

FIG. 11 is a block diagram of a conventional mobile terminal apparatus. FIG. 12 is a perspective view of a hinge part of the conventional mobile terminal apparatus. FIG. 13 is an exploded perspective view of the hinge part.

As shown in FIGS. 11 to 13, the conventionally mobile terminal apparatus of a flip type includes a fixed part (fixed housing) 1 and a moving part (moving housing) 3 that contain various types of mounted devices 1a, 3a for various functions of the mobile terminal apparatus, as well as a plurality of circuit devices (not shown). The fixed part 1 and the moving part 3 are linked via a pair of hinge parts 2 in an openable and closable manner.

The mounted devices 1a in the fixed part 1 include keys used for various input operations and a central processing unit (CPU) for performing numerical and logical computations. The mounted devices 3a in the moving part 3 include, for example, a liquid crystal display (LCD), a speaker, an imaging device, an IrDA device, an status sensor, a light sensor, a TV tuner, a radio tuner, and a light emitting diode (LED).

The fixed part 1 and the moving part 3 incorporate their respective circuit boards (not shown) for providing functionality for the mounted devices 1a, 3a. Because a bidirectional signal transmission is required, a connection is established between the boards via the hinge parts 2 using, for example, a flexible board or a wire bundle 4 and connectors 5.

As shown in FIGS. 12 and 13, the fixed part 1 and the moving part 3 are linked via the pair of hinge parts 2, which are formed to allow swing motion by inserting hinge shafts 8 into insertion holes 21 in bearing members 20a, 20b. The fixed part 1 includes insertion holes 22. The moving part 3 includes stopper parts 23 for limiting positions of the hinge shafts 8 in the bearing members 20b.

The related conventional technology is disclosed in Japanese Patent Application-Laid-Open No. H10-97346, Japanese Patent Application-Laid-Open No. 2002-157046, and Japanese Patent Application-Laid-Open No. 2005-64843.

In the conventional mobile terminal apparatus shown in FIGS. 11 to 13, however, interface signals between the boards are electrically connected using, for example, the flexible board or wire bundle 4, which can cause various problems as described below.

Because the mobile terminal apparatus is opened and closed repeatedly and the flexible board or wire bundle 4 moves together with the hinge parts 2, a failure may happen, such as a break of signal lines due to an external force from bending, twisting, and pulling of the flexible board or wire bundle 4.

At a manufacturing process, a connection is established via the connectors 5 between the flexible board or wire bundle 4 and boards (not shown) disposed in the fixed part 1 and the moving part 3. Because the connection process is manually performed, manufacturing defects tend to occur, including a poor contact in the connectors 5.

The flexible board or wire bundle 4 must be contained in the hinge parts 2, and therefore securing of room for mounting the flexible board or wire bundle 4 becomes a stumbling block for a reduction of a size of the mobile terminal apparatus.

Furthermore, because the boards (not shown) are connected using the flexible board or wire bundle 4, routing of the signal lines becomes long, which results in an increase of a resistive component and capacitive component that can cause a signal degradation.

In the connection between the boards using the flexible board or wire bundle 4, signals propagate through board→connector→flexible cable (long signal line) →connector→board. This causes a greater impedance change or a larger noise emission due to the routing of the signal lines.

In the conventional technologies disclosed in the first and the second literatures, although the mobile terminal apparatus supports an optical communication of display data, only a unidirectional communication from the fixed part to the moving part can be implemented.

In a mobile terminal apparatus according to the present invention, a bidirectional data communication is required because it is assumed that a moving part contains the mounted devices, including an LCD, a speaker, an imaging device, an IrDA device, a status sensor, a light sensor, a TV tuner, and a radio tuner, as in the conventional mobile terminal apparatus described above. Therefore, the conventional technologies disclosed in the first and the second literatures cannot be applied as they are.

In the conventional technology disclosed in the third literature, two housings disposed in an overlapped manner are linked by a linking unit so as to be mutually swingable around an axis extending in a lap direction. Although the bidirectional optical communication is enabled, the structure is different from that of the mobile terminal apparatus of the flip type described above.

In other words, each of the fixed part and the moving part has a light emitting unit and a light receiving unit so that they face each other with their optical axes aligned, and that the axes are disposed in the thickness directions of the sections. Therefore, the optical axes are always aligned, regardless of the relative positions (swing positions) of the fixed part and the moving part.

However, in the mobile terminal apparatus of the flip type (see FIG. 12), the hinge shafts 8 in the hinge parts 2 are disposed in a direction orthogonal to the thickness direction of the fixed part 1. In a design layout, limited space makes it difficult to place a light emitting unit and a light receiving unit to face each other, concentrically with the hinge shafts 8 so as to align their optical axes.

SUMMARY OF THE INVENTION

It is an object of the present invention to at least solve the problems in the conventional technology.

A mobile terminal apparatus according to one aspect of the present invention, having a fixed housing and a moving housing linked via a hinge part in an openable and closable manner, includes an optical communication unit that performs a bidirectional information transmission between a circuit device in the fixed housing and a circuit device in the moving housing with an optical signal. The optical communication unit includes a light transmitting unit that transmits the optical signal, a light receiving unit that receives the optical signal from the light transmitting unit, and a light propagation path for propagating the optical signal from the light transmitting unit to the light receiving unit. The light propagation path is disposed inside the hinge part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention will be explained below in detail with reference to the accompanying drawings. According, to the embodiments, the present invention is applied to a mobile telephone. It should be noted, however, that the present invention is not limited to the embodiments.

Figure 1:
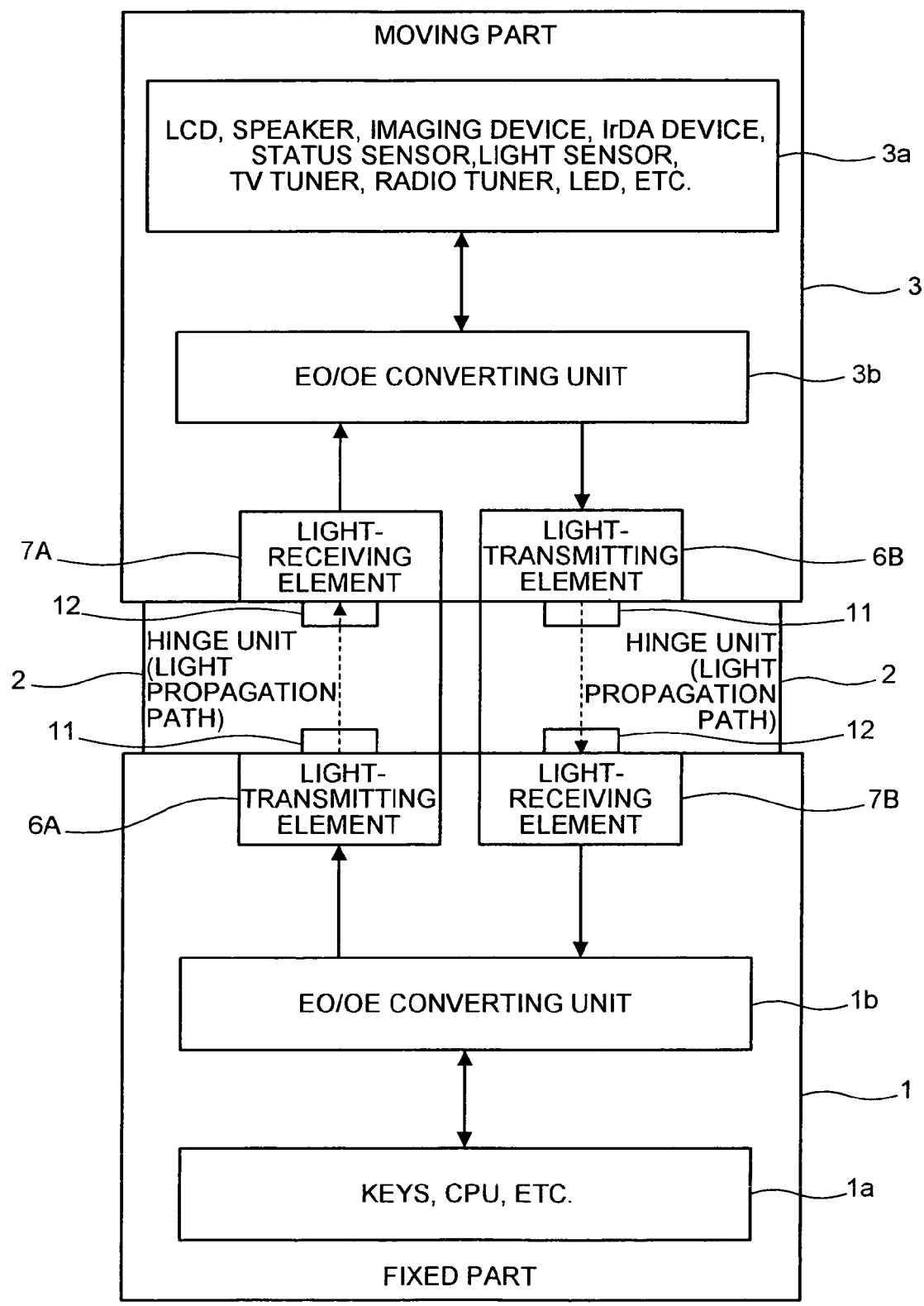
FIG. 1 is a block diagram of a mobile terminal apparatus according to a first embodiment of the present invention.
Figure 2:
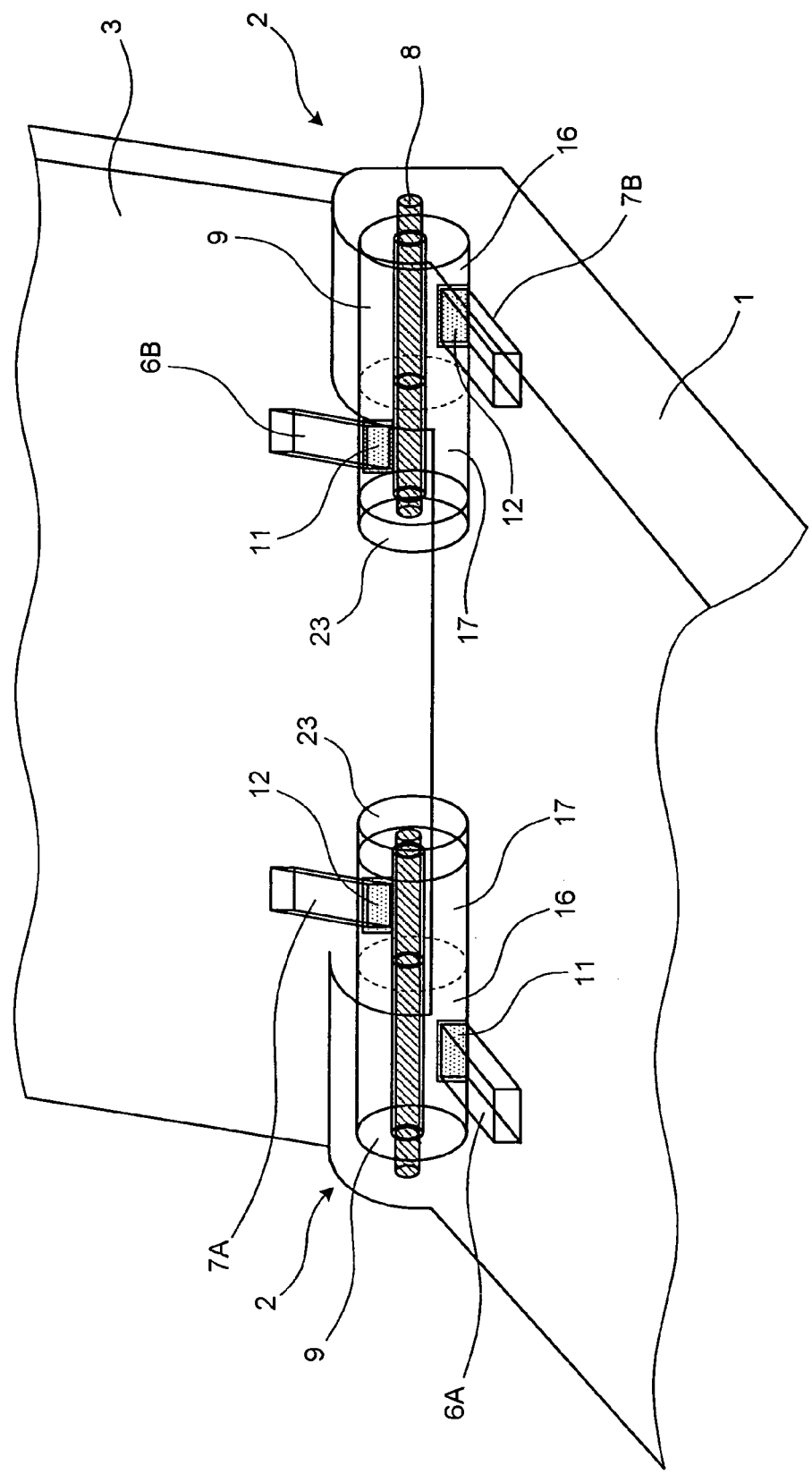
FIG. 2 is a perspective view of an optical communication unit in a hinge part according to the first embodiment.
Figure 3:
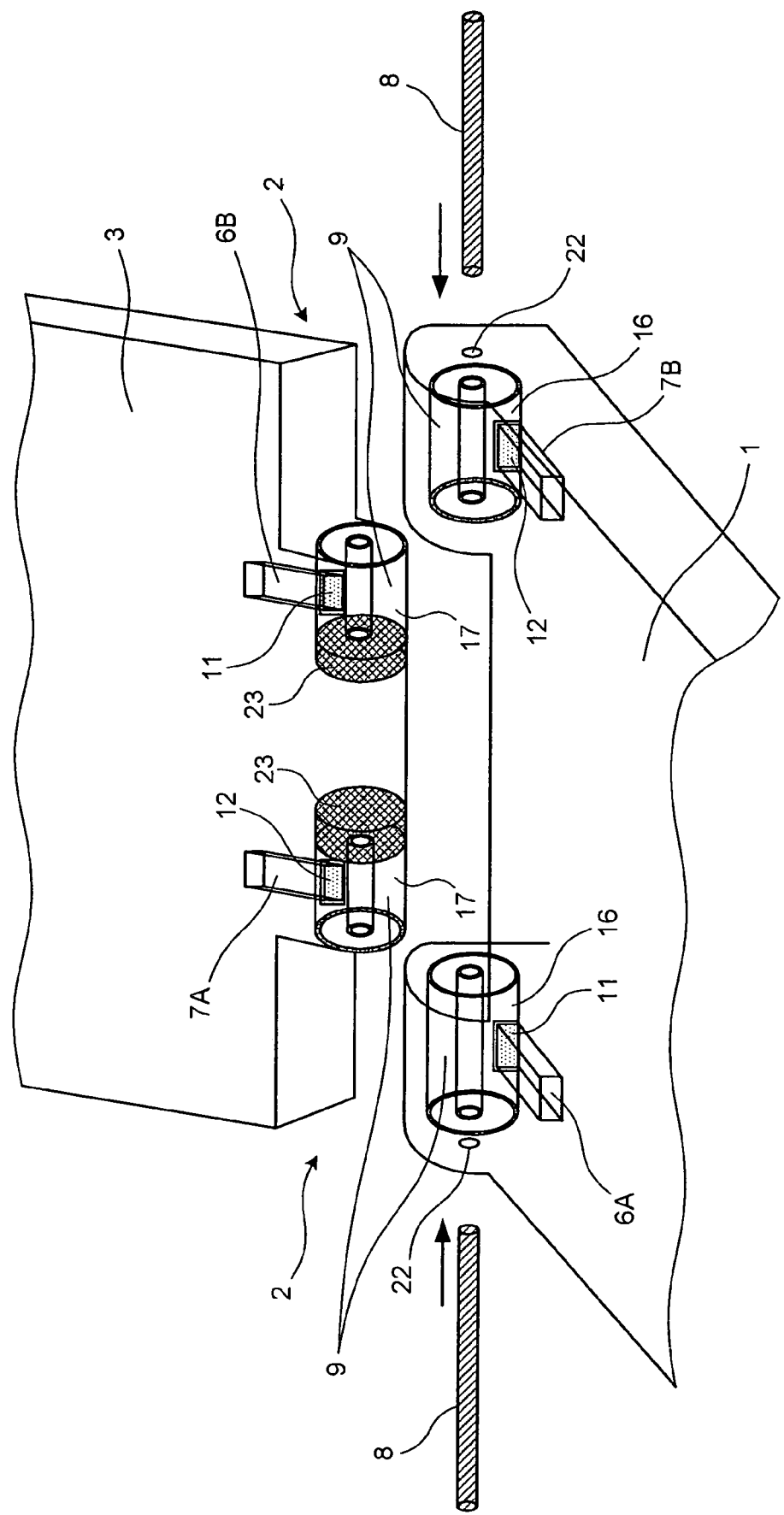
FIG. 3 is an exploded perspective view of the optical communication unit according to the first embodiment.
Figure 4:
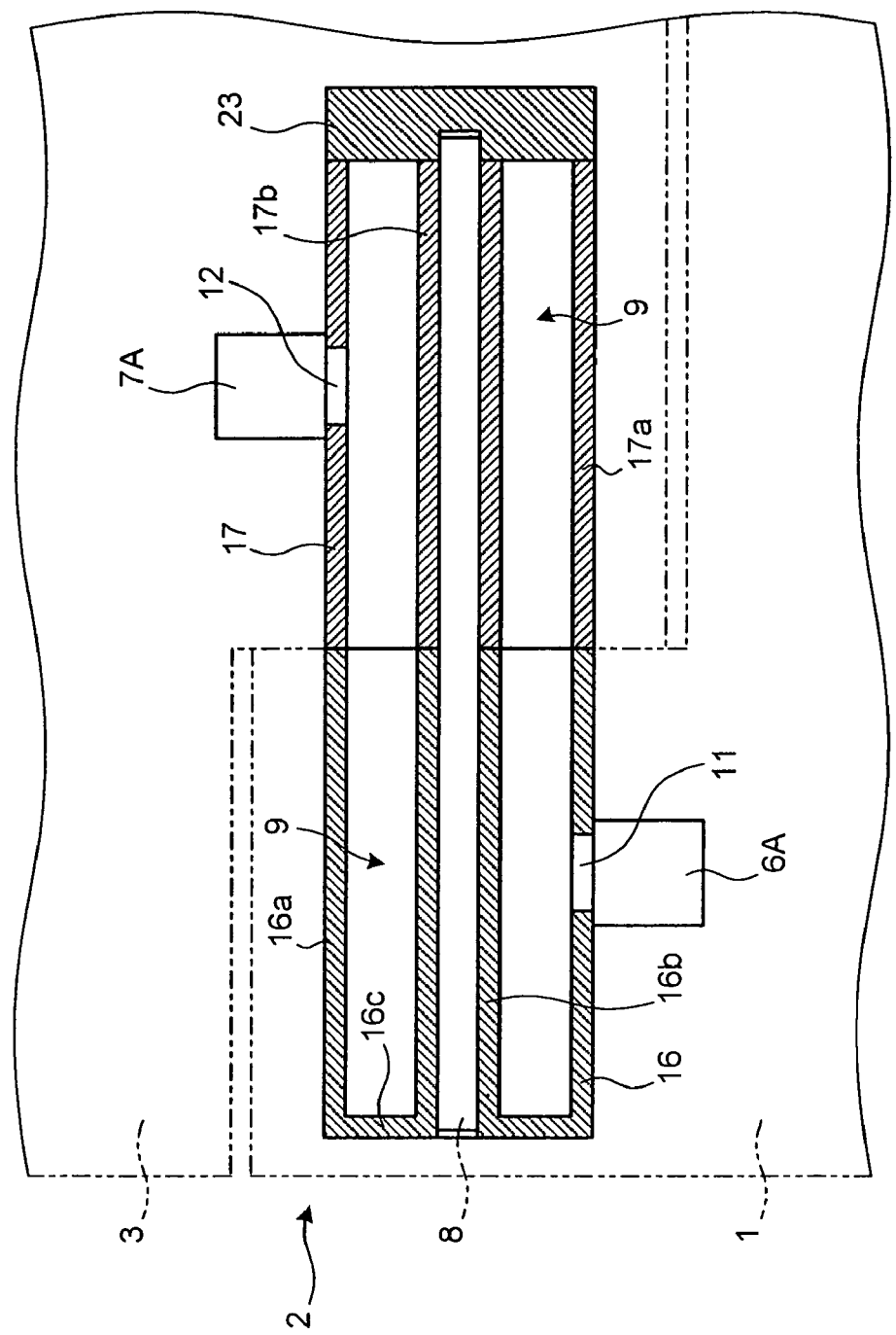
FIG. 4 is a cross section of a light propagation path in the hinge part.

FIG. 1 is a block diagram of a mobile terminal apparatus (mobile telephone) according to a first embodiment of the present invention. FIG. 2 is a perspective view of an optical communication unit in a hinge part according to the, first embodiment. FIG. 3 is an exploded perspective view of the optical communication unit according to the first embodiment. FIG. 4 is a cross section of a light propagation path in the hinge part. Members identical or equivalent to those already described will be designated below by the same reference numerals, with their details omitted or simplified.

As shown in FIGS. 1 to 3, the mobile telephone includes the fixed part 1 and the moving part 3 that contain various types of the mounted devices 1a, 3a a variety of functions of the mobile telephone, as well as various circuit devices 1b, 3b. The fixed part 1 and the moving part 3 are linked via the hinge parts 2 in an openable and closable manner. The circuit devices 1b, 3b are used to convert electrical signals into optical signals and vice versa. Specific examples of the mounted devices 1a, 3a are the same in the conventional technology descried above, so their details are omitted.

The mobile telephone includes an optical communication unit for performing a bidirectional information transmission between the circuit devices 1b and 3b by using optical signals. The optical communication unit includes light-transmitting elements (light transmitting units) 6A, 6B for transmitting optical signals, light-receiving elements (light receiving units) 7A, 7B for receiving the optical signals from the light-transmitting elements 6A, 6B, and light propagation paths 9 for propagating the optical signals from the light-transmitting elements 6A, 6B to the light-receiving elements 7A, 7B. The light propagation paths 9 are disposed inside the hinge parts 2.

For descriptive purposes, the elements disposed on a communication path from the fixed part 1 to the moving part 3 are marked with A, and those disposed on a communication path from the moving part 3 to the fixed part 1 are marked with B.

As shown in FIGS. 4, 2, and 3, the light propagation paths 9 are formed inside light-propagation-path forming members 16, 17 that function as bearing members for rotatably supporting the hinge shafts 8 in the hinge parts 2, sharing the same axis with the hinge shafts 8. The light-propagation-path forming member 16 is fixed inside the hinge part 2 on a side of the fixed part 1, and the light-propagation-path forming member 17 is fixed inside the hinge part 2 on a side of the moving part 3.

The light-propagation-path forming members 16, 17 are formed in a shape of a bottomed double-cylinder casing. The light-propagation-path forming member 16 includes an external cylinder part 16a, an internal cylinder part 16b, and a bottom plate part 16c, supporting the hinge shaft 8 inserted into a center of the internal cylinder part 16b.

The light-propagation-path forming member 17 includes an external cylinder part 17a, an internal cylinder part 17b, and a stopper part 23, supporting the hinge shaft 8 inserted into a center of the internal cylinder part 17b. The motion of the end of the hinge shaft 8 in the axis direction is restricted by the stopper part 23.

The ends of the light-propagation-path forming members 16, 17 are mutually kept into contact even when swing motion occurs in the hinge parts 2. A sleeve member (not shown) may be provided around a contact portion to ensure the contact during swing motion in the hinge parts 2.

The light propagation path 9 is formed with a space blocked out by the external cylinder parts 16a, 17a, the internal cylinder parts 16b, 17b, the bottom plate part 16c, and the stopper part 23.

A light-transmitting window 11 for the light-emitting element 6A and a light-receiving window 12 for the light-receiving element 7A are provided at prescribed locations on the external cylinder parts 16a, 17a. The light-emitting element 6A is disposed inside the fixed part 1 so as to face the light-transmitting window 11. The light-receiving element 7A is disposed inside the moving part 3 so as to face the light-receiving window 12.

A highly reflective material with a high reflectivity is disposed inside the light-propagation-path forming members 16, 17. The highly reflective material may be formed, for example, with a coating of chromium, gold, gold alloy, rhodium, or nickel.

The light-propagation-path forming members 16, 17 are also provided in the hinge part 2 of the other side, as shown in FIGS. 2 and 3.

Electrical signals from the mounted devices la in the fixed part 1 are converted into optical signals by the circuit device 1b, and the signals are transmitted from the light-transmitting element 6A into the light propagation path 9 through the light-transmitting window 11. The transmitted optical signals are received by the light-receiving element 7A through the light-receiving window 12. The received optical signals are converted into electrical signals by the circuit device 3b in the moving part 3, which are then used to control the mounted devices 3a.

Electrical signals from the mounted devices 3a in the moving part 3 are converted into optical signals by the circuit device 3b, which are then transmitted from the light-transmitting element 6B into the light propagation path 9 through the light-transmitting window 11. The transmitted optical signals are received by the light-receiving element 7B through the light-receiving window 12. The received optical signals are converted into electrical signals by the circuit device 1b in the fixed part 1, which are then sent to the mounted devices 1a.

As describe above, the mobile terminal apparatus according to the first embodiment has a simple structure that enables a bidirectional optical communication between the circuit devices 1b, 3b. A support for the bidirectional optical communication eliminates a need for a flexible board or wire bundle, with no possibility of a failure such as the break in signal lines.

Also, there is no possibility of poor connector contacts because connectors are no longer needed. Elimination of the room for these parts contributes to a reduction of a size and a weight of the mobile terminal apparatus.

Because the flexible board or wire bundle is unnecessary, an increase in a resistive component and capacitive component can be suppressed. Therefore, a signal degradation can also be suppressed. In addition, an impedance change and a noise emission due to routing of signal lines can also be suppressed.

While being reflected within the light propagations paths 9, optical signals are transmitted from the light-transmitting elements 6A, 6B to the light-receiving elements 7A, 7B. A design layout is thus simplified because there is no need for placing a pair of elements to face each other along the same axis.

Figure 5:
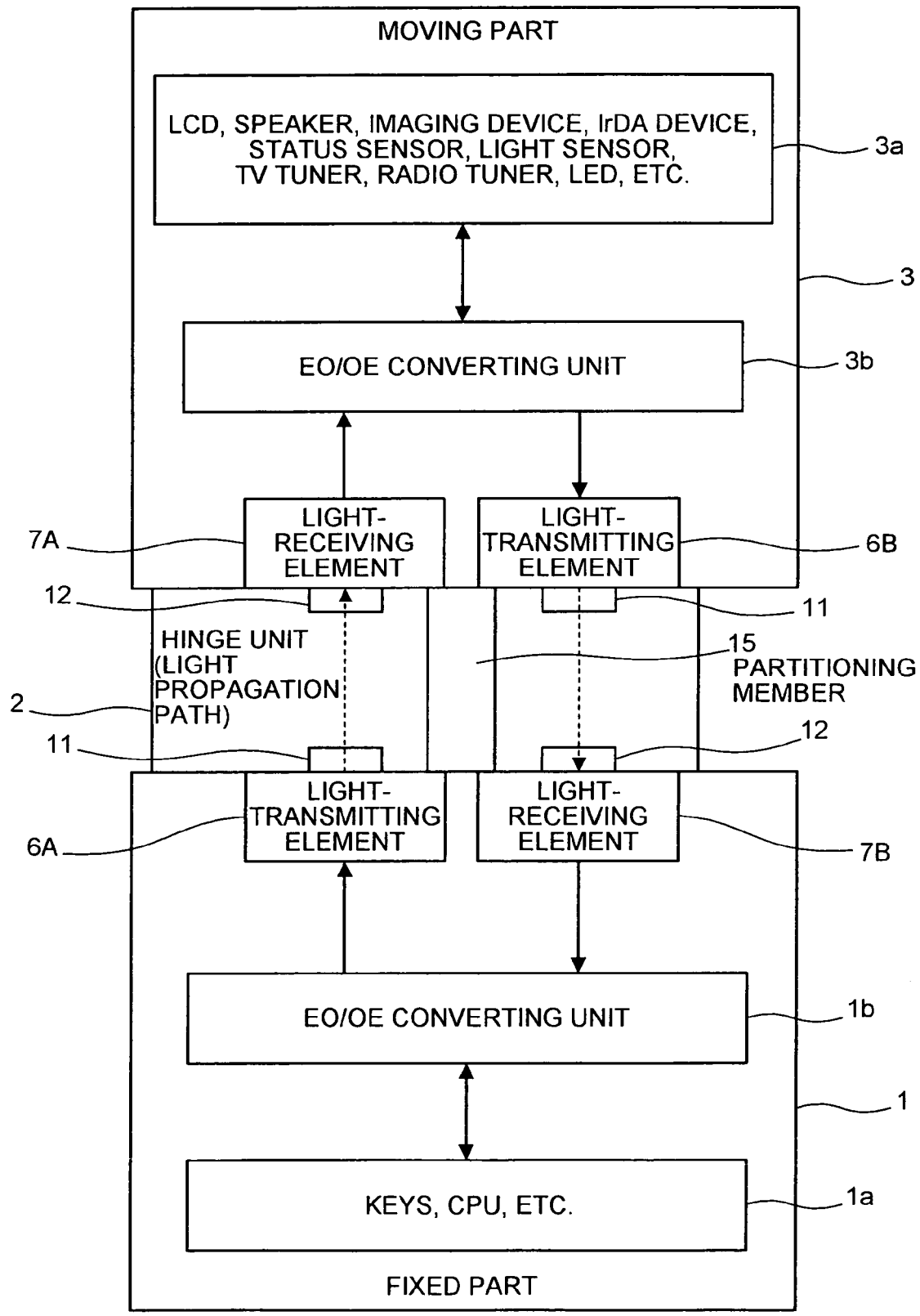
FIG. 5 is a block diagram of a mobile terminal apparatus according to a second embodiment of the present invention.
Figure 6:
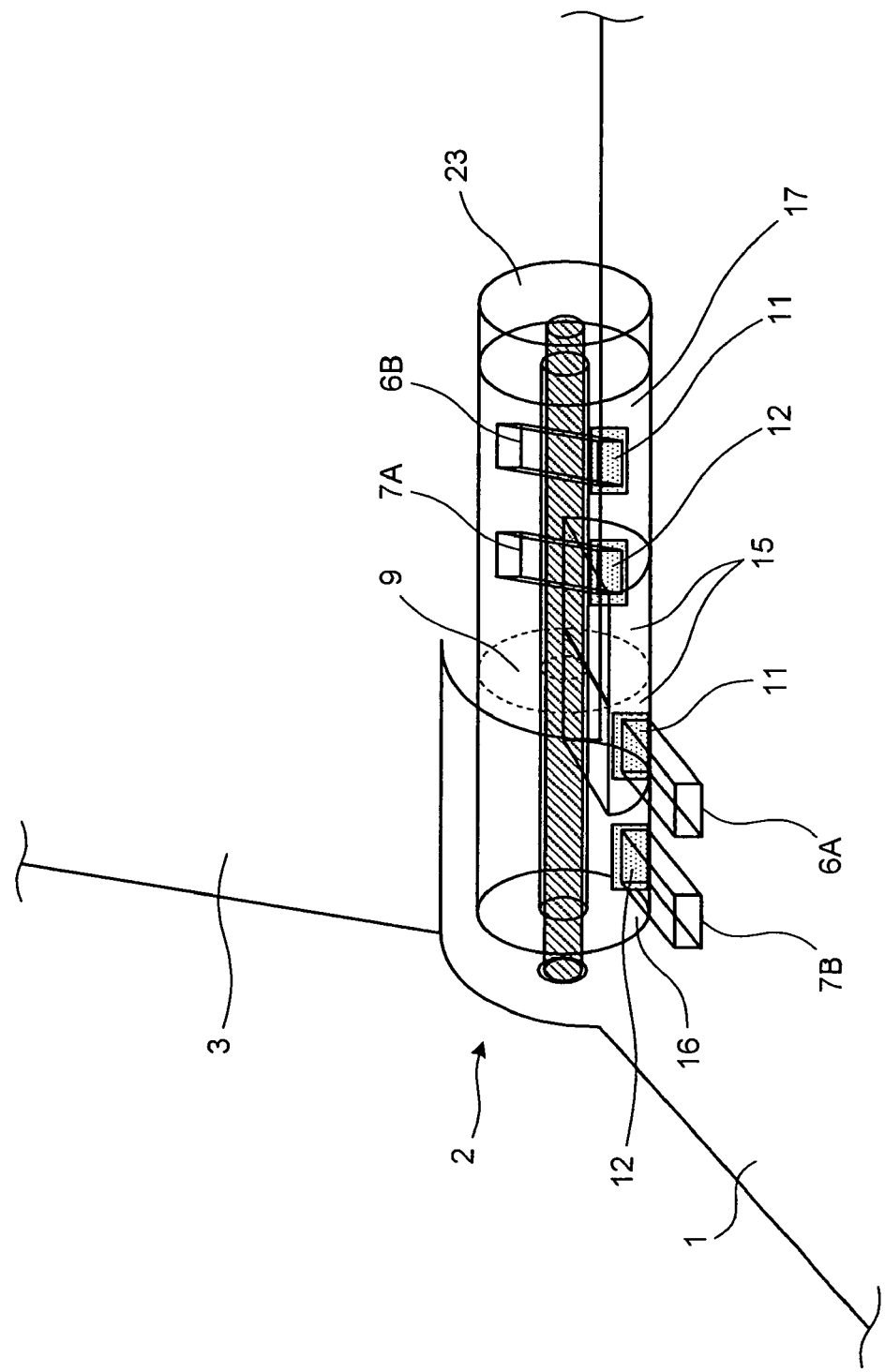
FIG. 6 is a perspective view of an optical communication unit in a hinge part according to the second embodiment.
Figure 7:
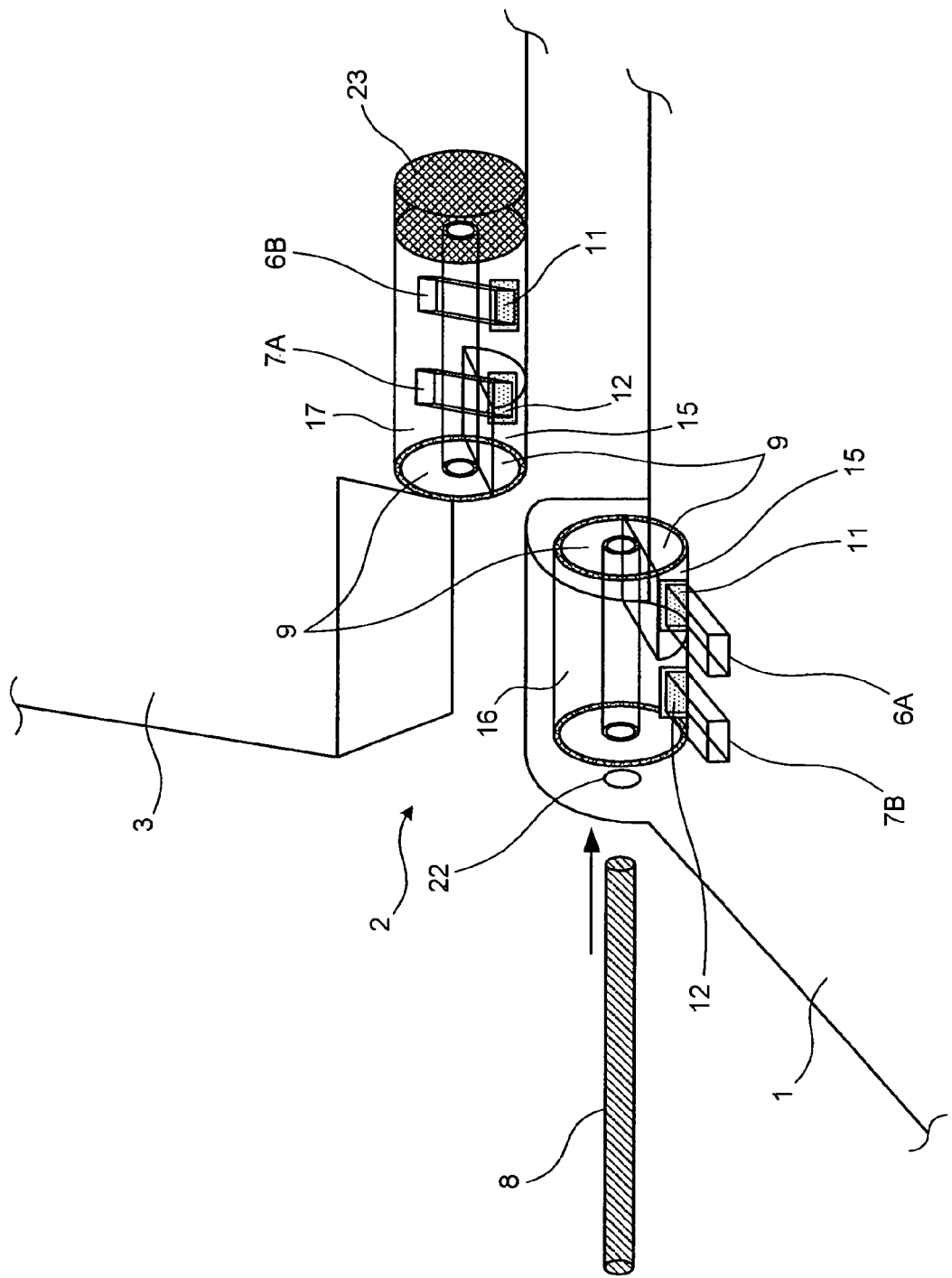
FIG. 7 is an exploded perspective view of the optical communication unit according to the second embodiment.

FIG. 5 is a block diagram of a mobile terminal apparatus (mobile phone) according to a second embodiment of the present invention. FIG. 6 is a perspective view of an optical communication unit in a hinge part according to the second embodiment. FIG. 7 is an exploded perspective view of the optical communication unit according to the second embodiment.

As shown in FIGS. 5 to 7, the mobile phone according to the second embodiment includes a pair of the light-transmitting element 6A and the light-receiving element 7A and a pair of the light-transmitting element 6B and the light-receiving element 7B disposed in such a manner that the light-emitting element in each pair faces the corresponding light-receiving element through one light propagation path 9. In other words, the hinge part 2 is provided in only one location.

In this case, it is necessary to prevent coupling between optical signals from the moving part 3 to the fixed part 1 and those from the fixed part 1 to the moving part 3. For this reason, a partitioning member 15 is provided inside the light propagation path 9 to obtain two separate optical signal propagation paths.

As shown in FIGS. 6 and 7, a prism in a shape of a semicircular cylinder may be used as the partitioning member 15. Other structural features and operation are the same as those of the mobile phone according to the first embodiment described above, so their details are omitted.

In addition to producing the same effects as the mobile phone according to the first embodiment is applied, the mobile phone according to the second embodiment can prevent a coupling between optical signals from the moving part 3 to the fixed part 1 and those from the fixed part 1 to the moving part 3 by using the partitioning member 15, even when a pair of the light-transmitting element 6A and the light-receiving element 7A and another pair of the light-transmitting element 6B and the light-receiving element 7B are disposed so that the light-emitting element in each pair faced the corresponding light-receiving element through one light propagation path 9.

Figure 8:
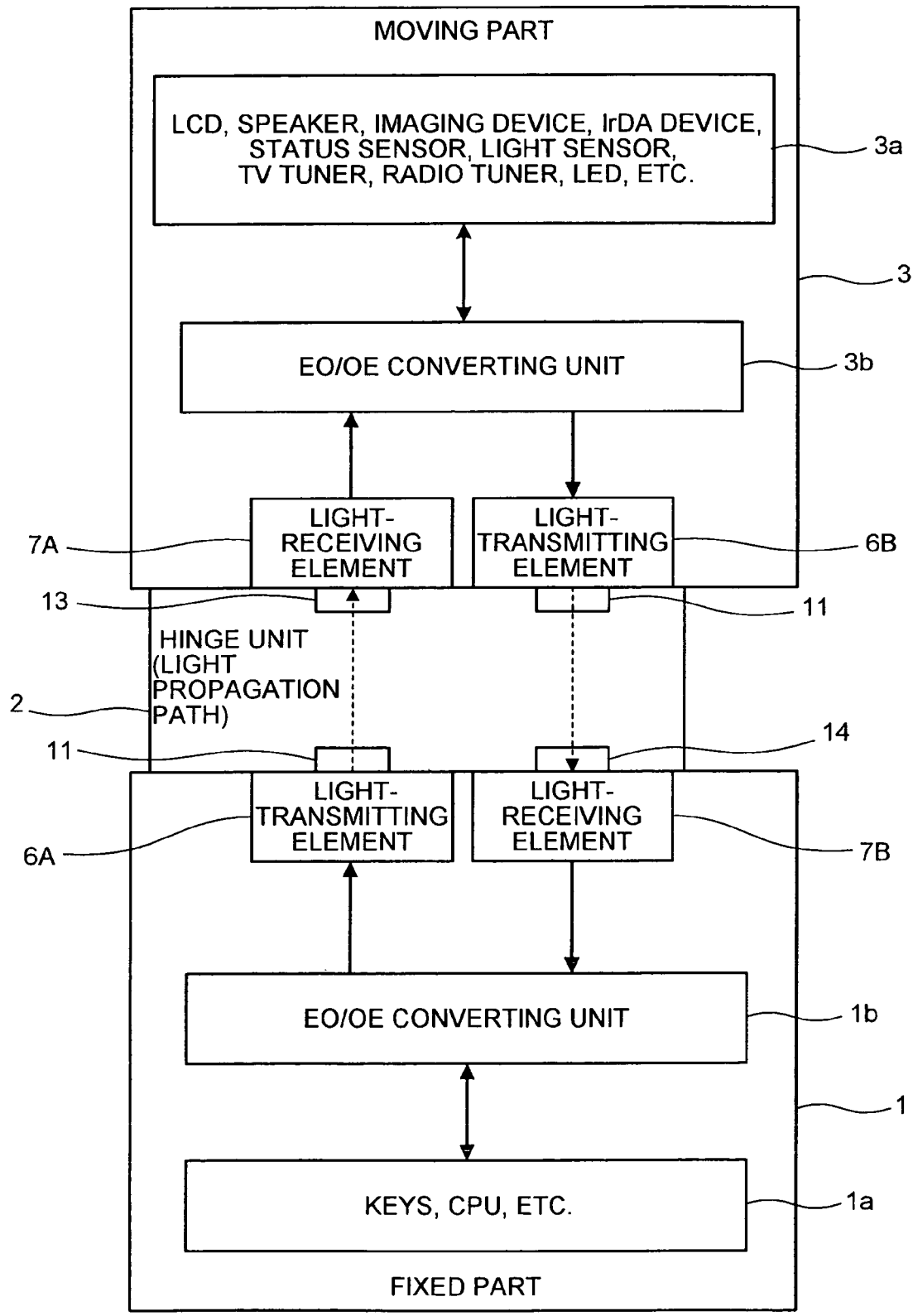
FIG. 8 is a block diagram of a mobile terminal apparatus according to a third embodiment of the present invention.
Figure 9:
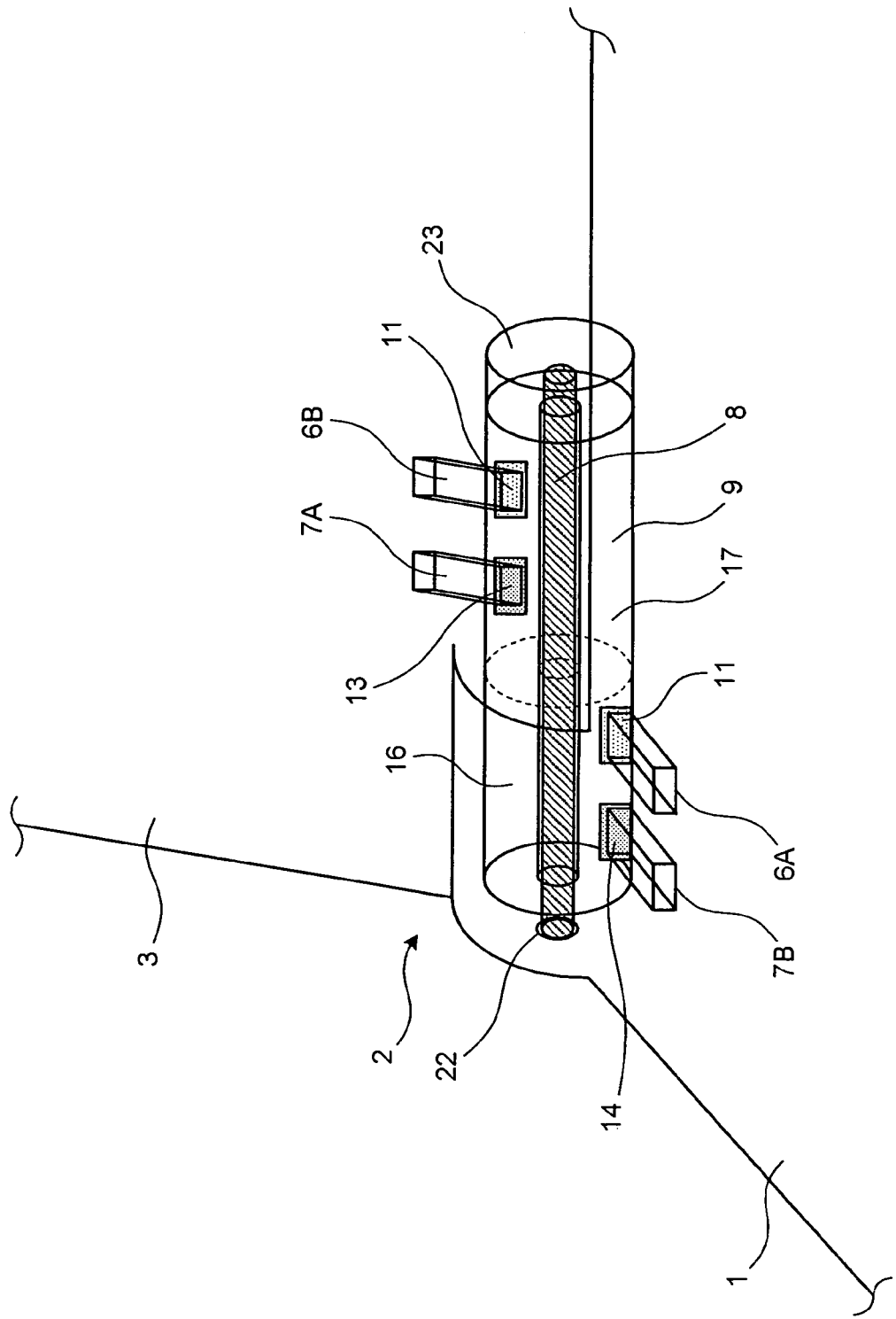
FIG. 9 is a perspective view of an optical communication unit in a hinge part according to the third embodiment.
Figure 10:
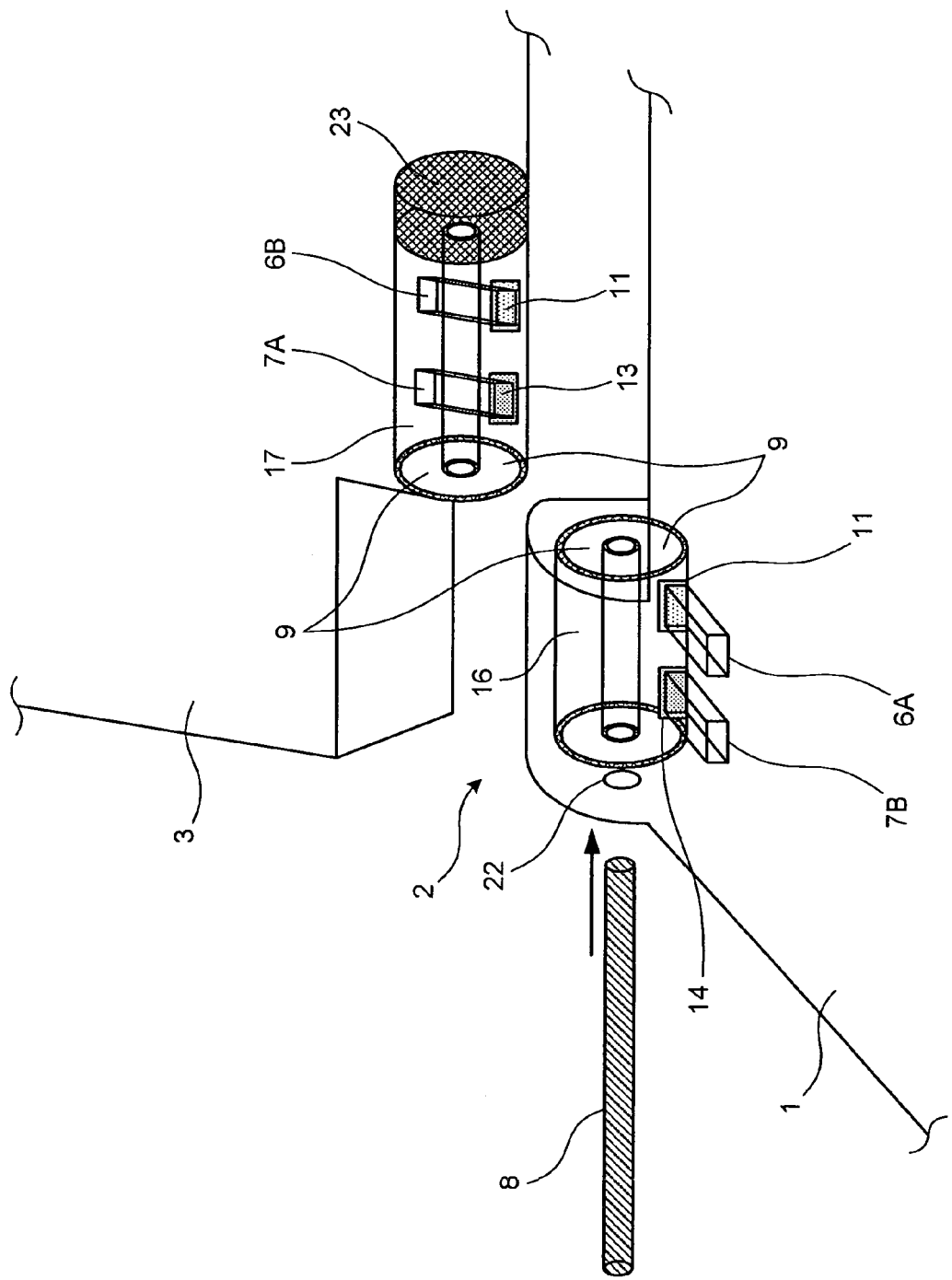
FIG. 10 is an exploded perspective view of the optical communication unit according to the third embodiment.
Figure 11:
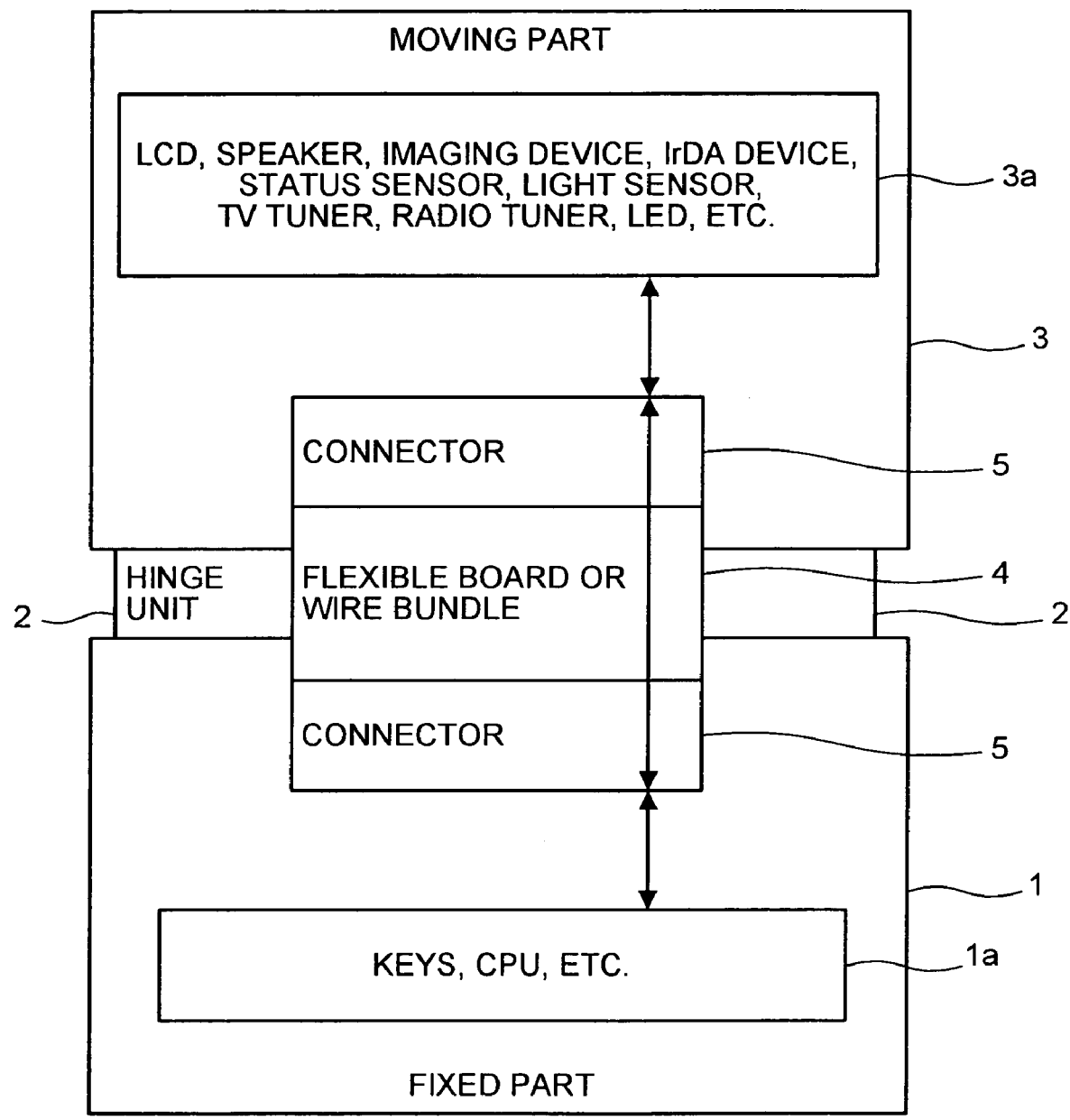
FIG. 11 is a block diagram of a mobile terminal apparatus according to a conventional technology.
Figure 12:
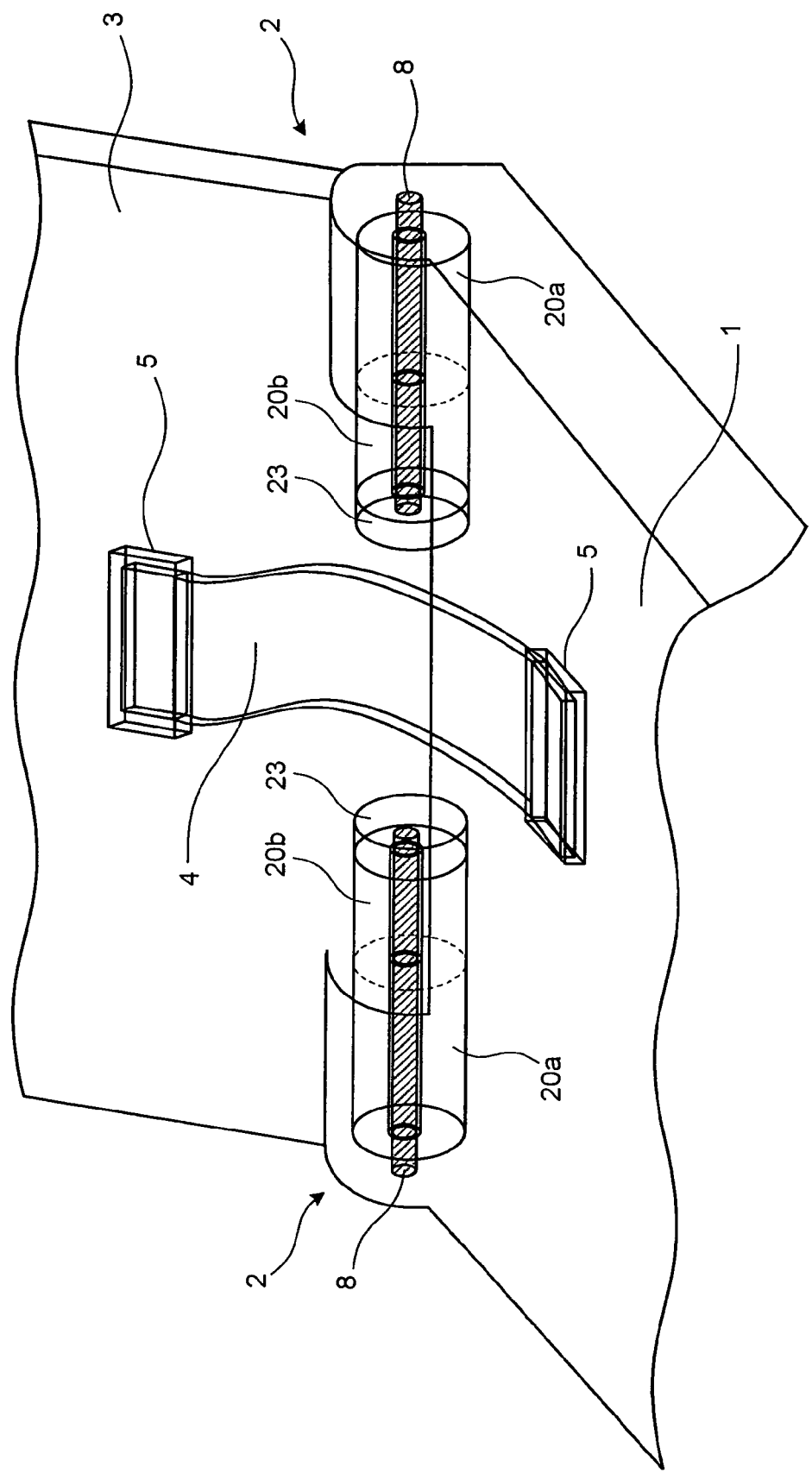
FIG. 12 is a perspective view of an optical communication unit in a hinge part according to the conventional technology.
Figure 13:
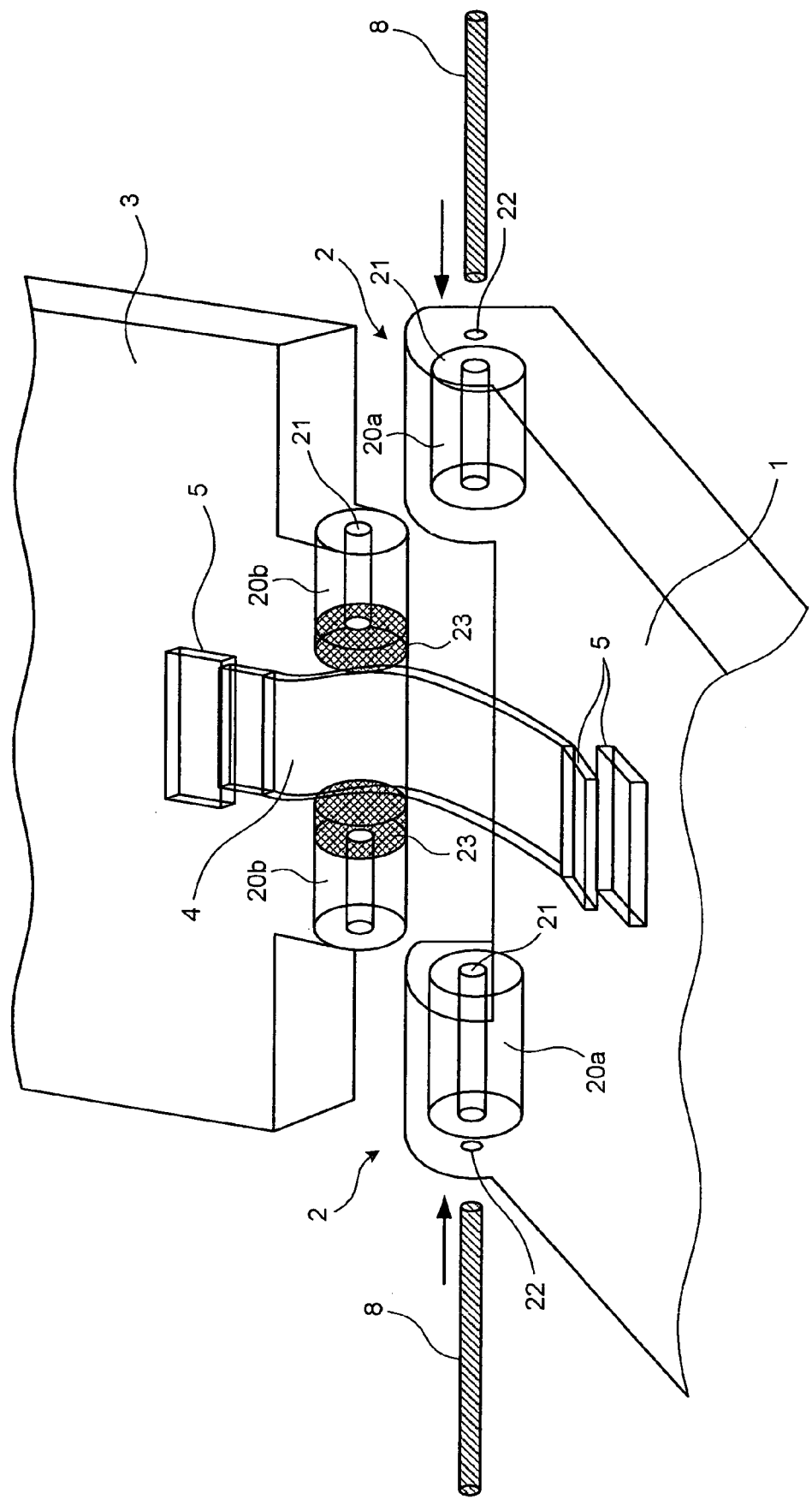
FIG. 13 is an exploded perspective view of the optical communication unit according to the conventional technology.

FIG. 8 is a block diagram of a mobile terminal apparatus (mobile telephone) according to a third embodiment of the present invention. FIG. 9 is a perspective view of an optical communication unit in a hinge part according to the third embodiment. FIG. 10 is an exploded perspective view of the optical communication unit according to the third embodiment.

As shown in FIGS. 8 to 10, the mobile phone according to the third embodiment includes a pair of a light-transmitting element 6A and the light-receiving element 7A and another pair of the light-transmitting element 6B and the light-receiving element 7B disposed so that the light-emitting element in each pair faces the corresponding light-receiving element through one light propagation path 9. In other words, the hinge part 2 is provided in only one location.

In this case, it is necessary to prevent a coupling between optical signals from the moving part 3 to the fixed part 1 and those from the fixed part 1 to the moving part 3. For this reason, different wavelengths are allocated for optical signals transmitted from the light-transmitting elements 6A, 6B, and filters corresponding to the wavelengths are provided on light-receiving windows 13, 14 of the light-receiving elements 7A, 7B corresponding to the light-transmitting elements 6A, 6B, respectively. Other structural features and operation are the same as those of the mobile phone according to the first embodiment described above, so their details are omitted.

In addition to producing the same effects as the mobile phone according to the first embodiment is applied, the mobile telephone according to the third embodiment can prevent a coupling between optical signals from the moving part 3 to the fixed part 1 and those from the fixed part 1 to the moving part 3 by using the light-receiving windows 13, 14 with the filters, even when a pair of the light-transmitting element 6A and the light-receiving element 7A and another pair of the light-transmitting element 6B and the light-receiving element 7B are disposed so that the light-emitting element in each pair faces the corresponding light-receiving element through one light propagation path 9.

In the above description according to the first to the third embodiments, the present invention is applied to a mobile telephone. However, the present invention is not limited to such an application and may also be applied to various types of mobile terminal apparatuses, such as a personal handyphone system (PHS), a personal digital assistance (PDA), a notebook personal computer, and a digital imaging device.

In the above description according to the second and the third embodiments, a pair of the light-transmitting element 6A and the light-receiving element 7A and another pair of the light-transmitting element 6B and the light-receiving element 7B are disposed so that the light-transmitting element in each pair faces the corresponding light-receiving element through one light propagation path 9. However, the present invention is not limited to such disposition. Three or more pairs of elements may be provided, and the number of partitioning members 15 or filters described above may be set depending on the number of pairs.

According to the present invention, a design layout is simplified and bidirectional optical communication is enabled between fixed and moving housings, achieving a terminal size reduction, an increase in reliability, and signal line noise rejection.

The present invention enables light propagation paths to be formed efficiently in limited space.

The present invention can improve reliability of communication by suppressing loss of signals during reflective propagation.

Furthermore, according to the present invention, even when two or more pairs of light-transmitting and light-receiving elements are disposed so that the light-transmitting element in each pair faces the corresponding light-receiving element through one light propagation path, the mobile terminal apparatus can prevent coupling between optical signals from the moving part to the fixed part and those from the fixed part to the moving part by using a partitioning member.

Moreover, according to the present invention, even when two or more pairs of light-transmitting and light-receiving elements are disposed so that the light-transmitting element in each pair faces the corresponding light-receiving element through one light propagation path, the mobile terminal apparatus can prevent coupling between optical signals from the moving part to the fixed part and those from the fixed part to the moving part by using light-receiving windows with filters.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile terminal apparatus having a fixed housing and a moving housing linked via a hinge part in an openable and closable manner, the mobile terminal apparatus comprising:
    an optical communication unit that performs a bidirectional information transmission between a circuit device in the fixed housing and a circuit device in the moving housing with an optical signal, wherein
    the optical communication unit includes
        a light transmitting unit that transmits the optical signal;
        a light receiving unit that receives the optical signal from the light transmitting unit; and
        a light propagation path for propagating the optical signal from the light transmitting unit to the light receiving unit, and
    the light propagation path is formed inside a light-propagation-path forming member that is formed in a shape of a bottomed double-cylinder casing and functions as a bearing member for supporting a hinge shaft in a rotatable manner in the hinge part, on a same axis as an axis of the hinge shaft.

2. The mobile terminal apparatus according to claim 1, wherein
    a highly reflective material with a high reflectivity is disposed inside the light-propagation-path forming member.

3. The mobile terminal apparatus according to claim 2, wherein
    the highly reflective material is formed with a coating of any one of chromium, gold, gold alloy, rhodium, and nickel.

4. The mobile terminal apparatus according to claim 1, wherein
    a plurality of light propagation paths are provided, and
    one pair of the light transmitting unit and the light receiving unit is disposed for each of the light propagation paths.

5. The mobile terminal apparatus according to claim 1, wherein
    at least two pairs of the light transmitting unit and the light receiving unit are disposed for the light propagation path, and
    a partitioning member is provided inside the light propagation path to obtain a separation between optical signals for each of the pairs of the light transmitting unit and the light receiving unit.

6. The mobile terminal apparatus according to claim 1, wherein
    at least two pairs of the light transmitting unit and the light receiving unit are disposed for the light propagation path,
    different wavelengths are allocated for optical signals for each of the pairs of the light transmitting unit and the light receiving unit, and
    the mobile terminal apparatus further comprises a filter corresponding to each of the wavelengths provided on the light receiving unit corresponding to the light transmitting unit.

* * * * *